Figure 1:
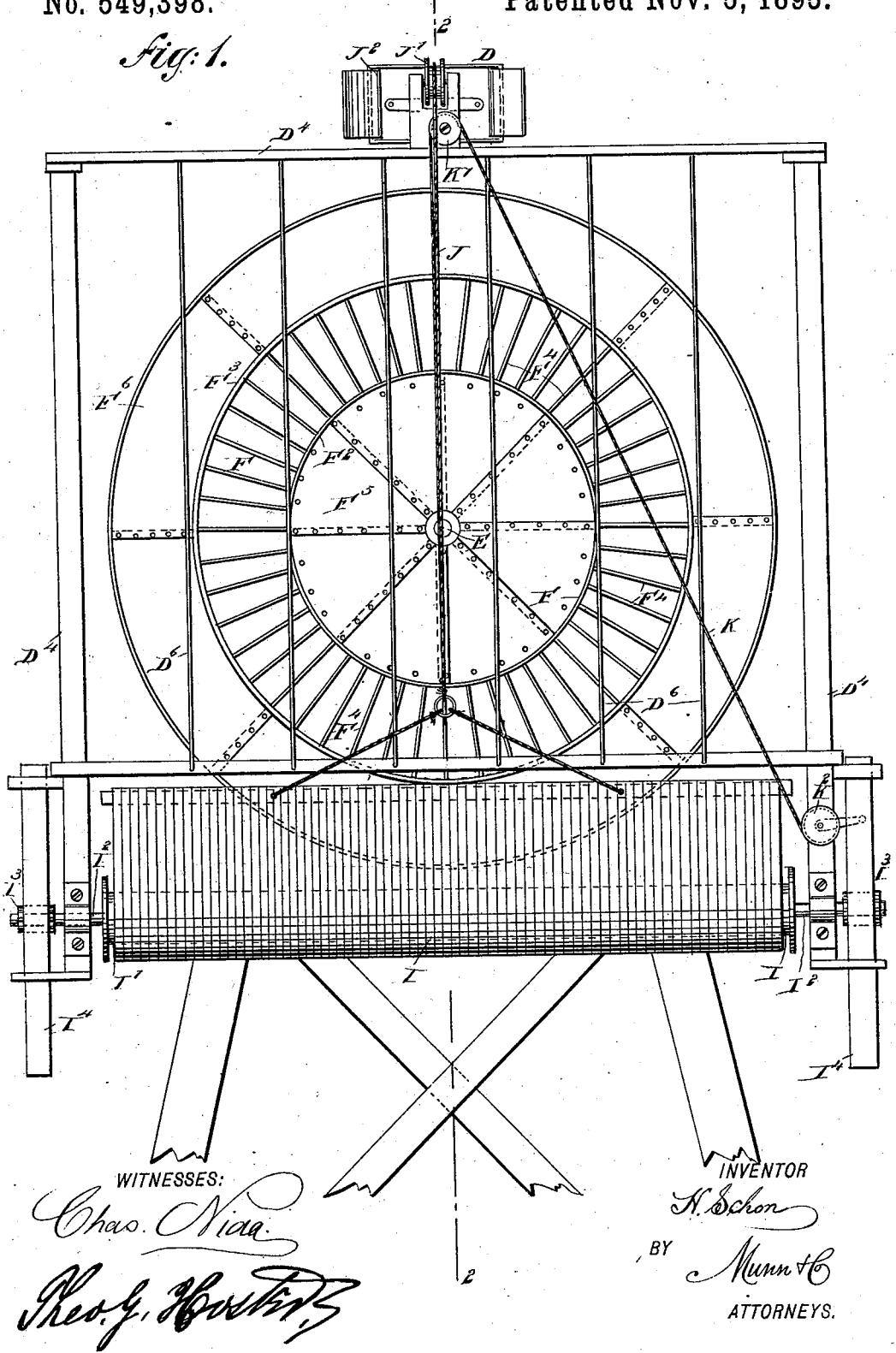

(No Model.) 3 Sheets—Sheet 1.

H. SCHON.
WINDMILL.

No. 549,398. Patented Nov. 5, 1895.

WITNESSES:
Chas. Nida
Theo. G. Hoster

INVENTOR
H. Schon
BY Munn & Co
ATTORNEYS.

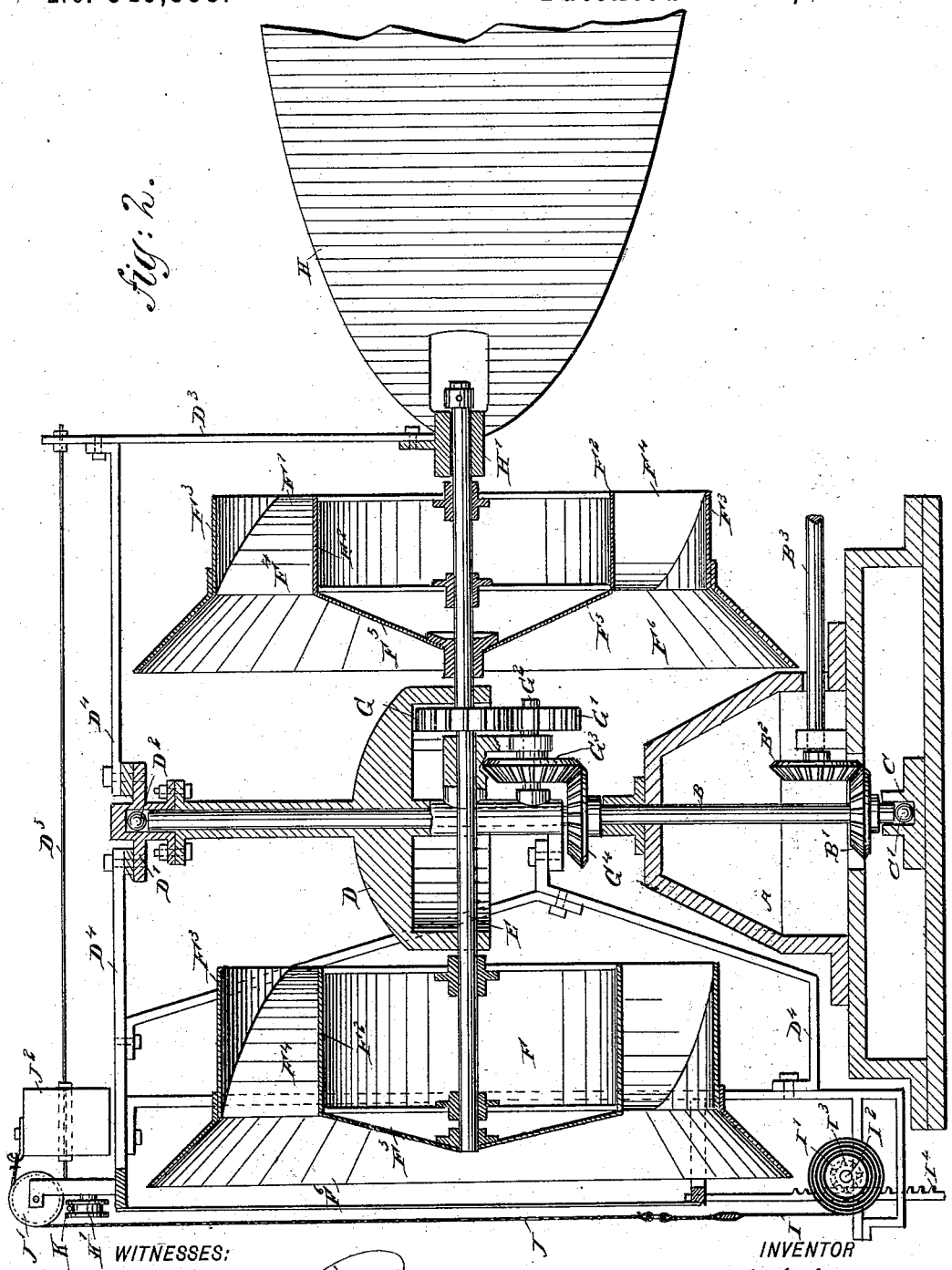

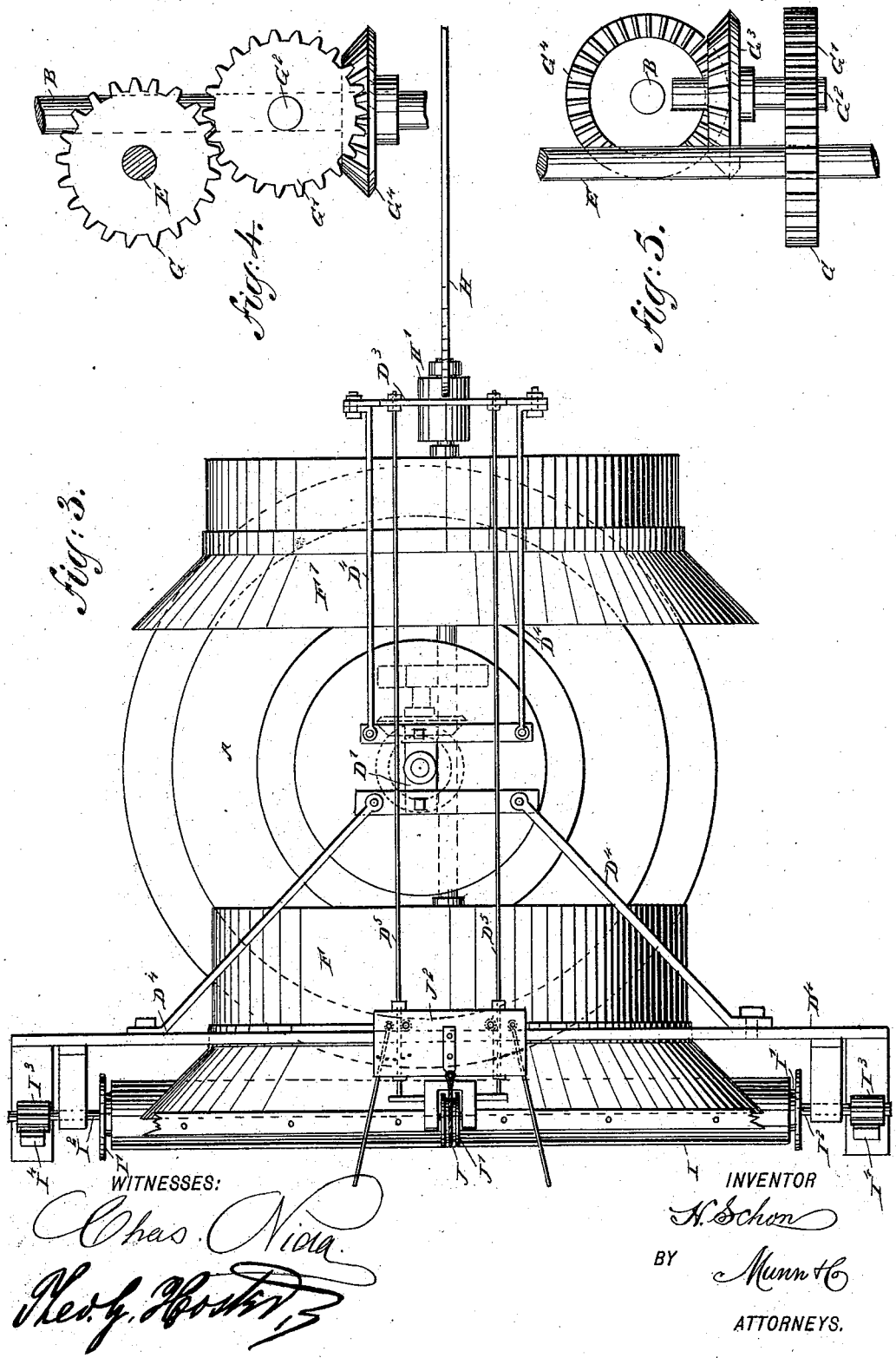

UNITED STATES PATENT OFFICE.

HUBERT SCHON, OF ALLEGHENY, PENNSYLVANIA, ASSIGNOR TO HIMSELF AND ANTON LUTZ, OF SAME PLACE.

WINDMILL.

SPECIFICATION forming part of Letters Patent No. 549,398, dated November 5, 1895.

Application filed April 9, 1895. Serial No. 545,108. (No model.)

*To all whom it may concern:*

Be it known that I, HUBERT SCHON, of Allegheny, in the county of Allegheny and State of Pennsylvania, have invented a new and Improved Windmill, of which the following is a full, clear, and exact description.

The object of the invention is to provide a new and improved windmill, arranged to utilize the force of the wind to the greatest advantage and adapted to automatically shut off the wind from the wheels in case of an increase in the velocity of the wind beyond a normal speed.

The invention consists, principally, of a shaft adapted to drive the working or main shaft and carrying one or more wind-wheels, the wheel-shaft being journaled in a frame supported from the main shaft.

Reference is to be had to the accompanying drawings, forming a part of this specification, in which similar letters of reference indicate corresponding parts in all the figures.

Figure 1 is a front elevation of the improvement. Fig. 2 is a sectional side elevation of the same on the line 2 2 of Fig. 1. Fig. 3 is a plan view of the same. Fig. 4 is an enlarged end elevation of the transmitting-gear for the wheel and driving-shafts, and Fig. 5 is a plan view of the same.

The improved windmill is provided with a suitable framework A, secured on a tower or other support, and forming a bearing for a vertically-disposed main shaft B, set at its lower end in a step C on a ball C', held on the said step, as is plainly shown in Fig. 2.

On the shaft B and near the lower end thereof is secured a beveled gear-wheel B', in mesh with a beveled gear-wheel B², attached on one end of a shaft B³, connected with the machinery to be driven. On the upper end of the shaft B is mounted loosely a frame D, provided at its top with a cap D', containing a ball D², resting on the upper end of the shaft B, so as to support the frame D on the said shaft and permitting the frame to turn thereon.

In the frame D is journaled a horizontally-disposed wheel-shaft E, passing at one side of the shaft B and carrying in the front and rear of the said shaft B the wind-wheels F and F', alike in construction, and each provided with an inner rim $F^2$ and outer concentric rim $F^3$, between which are held the obliquely-disposed wings or blades $F^4$, adapted to be acted upon by the force of the wind to turn the wheels to rotate the shaft E. The rim $F^2$ is closed at its front end by a cone $F^5$, and a hood $F^6$ is attached to the front end of the outer rim $F^3$ to gather the wind and carry the same to the wings or blades $F^4$. Now it will be seen that by this arrangement the entire amount of wind taken in by the hood $F^6$ is directed to the blades or wings $F^4$, it being understood that that amount of wind passing to the center of the wheel is directed outward to the wings by the cone $F^5$.

On the shaft F is secured a gear-wheel G, in mesh with a gear-wheel G', secured on a shaft $G^2$, journaled on the frame D and carrying a beveled gear-wheel $G^3$ in mesh with a like gear-wheel $G^4$, secured on the main shaft B. Thus the rotary motion of the wheel-shaft E is transmitted by the said gearing to the shaft B and by the latter, through the gear-wheels B' and B² and shaft B³, to the machinery to be actuated.

A vane H extends from the rear end of the shaft E, and is provided with a hub H', through which passes loosely the rear end of the shaft E, the said hub H' being attached to bars $D^3$, forming part of a skeleton framework $D^4$, attached to the frame D. The vane H serves to hold the wheels F and F' to the wind.

In order to regulate the speed of the windwheels, to prevent the same from rotating beyond the normal rate of speed on an increase of velocity of the wind, I provide an apron I, extending transversely and mounted on a roll I', having its shaft I² journaled in suitable bearings in the skeleton framework $D^4$ directly below the bottom of the hood $F^6$ for the front wheel F. The apron I is adapted to move upwardly in front of the hood $F^6$, so as to close the same to prevent the wind from passing to the wheels on an increase of velocity of the wind above a normal speed.

The apron I is attached at its upper edge to a rope J, which extends upwardly in front of the wheel F to pass over a pulley J' to connect with a governor J², fitted to slide longitudinally on guide-rods $D^5$, supported on the skeleton framework D⁴. This governor J² is in the form of a box adapted to be driven rearward by the force of the wind, so that on the rearward movement of the said box the rope J is pulled and the curtain or apron I is drawn up in front of the hood F⁶ to shut out the wind therefrom. As soon as the velocity of the wind decreases the apron or curtain I is again wound up on its roll I'; and for this purpose I provide the ends of the shaft I² with toothed trunnions I³, in mesh with vertically-disposed weighted racks I⁴, mounted to slide in suitable bearings in the skeleton framework D⁴. The racks I⁴ are sufficiently heavy to counterbalance the governor J², so as to return the latter to its normal position on a decrease in the velocity of the wind to wind up the apron I, so as to again permit the wind to act with normal pressure on the wheels F and F'.

In order to enable the operator to shut out the wind from the wheels whenever desired, I provide a second rope K, likewise connected with the apron I and extending upward to pass over a pulley K', journaled in the skeleton framework D⁴, and thence extending downward to wind on a drum K², under the control of the operator, and journaled on one side of the skeleton frame D⁴, as plainly indicated in Fig. 1.

It will be seen that by the arrangement described a wind-wheel is provided which is adapted to utilize the force of the wind to the fullest advantage, so that considerable power is transmitted to the machine to be driven.

Having thus fully described my invention, I claim as new and desire to secure by Letters Patent—

1. A wind mill, comprising a shaft connected with the driven shaft, one or more wheels secured on the said shaft, each wheel comprising two concentric rims, wings between the rims, a hood for the outer rim, and a cone for closing the inner rim at the front end thereof, substantially as shown and described.

2. A wind mill, comprising a main vertical shaft adapted to be connected with the machinery to be driven, a frame supported from the said shaft and adapted to turn thereon, a wind wheel journaled in the said frame, a gearing for connecting the two shafts with each other, and one or more wind wheels secured on the said wind wheel shaft, substantially as shown and described.

3. A wind mill, comprising a main vertical shaft adapted to be connected with the machinery to be driven, a frame supported from the said shaft and adapted to turn thereon, a wind wheel journaled in the said frame, a gearing for connecting the two shafts with each other, one or more wind wheels secured on the said wind wheel shaft, and a vane supported from the said shaft and extending in alignment with the said wheel shaft from the rear end thereof, substantially as shown and described.

4. A wind wheel comprising an outer rim, obliquely arranged blades within the same, and an annular cone-shaped hood surrounding said rim and adapted to gather the air and direct it against said blades, substantially as set forth.

5. In a wind mill, the combination of a frame, a wind wheel, a roller, an apron secured to and adapted to be wound on said roller and when unwound being adapted to shield said wind wheel and means connected to said apron actuated by the variation in the wind for unwinding and winding up said apron, substantially as set forth.

6. In a wind mill, the combination of a frame, a wind wheel, a roller, an apron secured to and adapted to be wound on said roller and when unwound being adapted to shield said wind wheel, means actuated by the variation in the wind for unwinding said apron and a tension device connected to said roller and adapted to be placed under tension when the same is rotated to unwind said apron, said tension device being arranged to rotate the roller in a direction to wind up the apron, substantially as set forth.

7. In a wind mill, the combination of a frame, a wind wheel, a roller, an apron secured to and adapted to be wound on said roller and when unwound adapted to shield said wind wheel, means actuated by the variations in the wind for unwinding said apron, a gear connected to said roller and adapted to be turned by the movement thereof, and a rack bar geared to said gear and adapted to be raised by the rotation of the roller when the apron is unwound, substantially as set forth.

8. In a regulating device for wind mills, the combination of a frame, guide rods mounted thereon parallel to each other, a box mounted to slide on said guide rods and adapted to be moved by the pressure of the wind, a wind wheel, an apron adapted to shield the same, means for holding said apron normally out of operative position, and a connection between the said box and said apron adapted when the box is moved by the wind to move the apron into its operative position, substantially as set forth.

9. In a wind mill, the combination, of a frame having a vertical arm, a horizontal shaft rotatively mounted on said frame, a wind wheel on said shaft, a collar on said shaft, and a vane having a tubular boss loosely mounted on said shaft inside said collar, said boss being connected to the vertical arm of the frames, substantially as set forth.

HUBERT SCHON.

Witnesses:
C. J. WEITERSHAUSEN,
JULIUS R. BELER.